United States Patent Office 3,542,807
Patented Nov. 24, 1970

3,542,807
1-(ω-BENZOYLALKYL)-3-SUBSTITUTED PYRROLIDINES
Carl Dalton Lunsford, William John Welstead, Jr., and Grover Cleveland Helsley, Richmond, Va., assignors to A. H. Robins Company, Incorporated, Richmond, Va., a corporation of Virginia
No Drawing. Continuation-in-part of application Ser. No. 592,263, Nov. 7, 1966. This application Apr. 14, 1969, Ser. No. 816,050
Int. Cl. C07d 27/04
U.S. Cl. 260—326.3    15 Claims

ABSTRACT OF THE DISCLOSURE

Novel 1-(ω-benzoylalkyl) - 3 - substituted pyrrolidines possessing CNS depressant activity are disclosed. The compounds are prepared from 1-benzoyl-3-(and 4)-haloalkanes and 3-substituted pyrrolidines.

---

The present application is a continuation-in-part of copending application Ser. No. 592,263 filed Nov. 7, 1966, now abandoned.

This invention relates to novel 1,3-disubstituted pyrrolidines. More particularly, this invention relates to 1-(ω-benzoylalkyl)-3-substituted pyrrolidines and processes for the preparation thereof, therapeutic compositions containing the same as active ingredients, and methods of making and using them.

In accordance with the present invention, there are provided novel basic 1-(ω-benzoylalkyl)-3-substituted pyrrolidines of the formula:

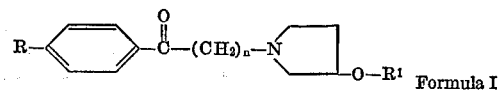

Formula I wherein:

R is hydrogen and halogen having an atomic weight less than 80,
$R^1$ is hydrogen, carbamoyl, lower-alkyl, lower-alkylcarbonyl, phenylcarbonyl and phenyl,
n is an integer from 3 to 4 inclusive, wherein phenyl is the unsubstituted phenyl radical and the substituted phenyl radical, and carbamoyl is the unsubstituted carbamoyl radical and the substituted carbamoyl radical, and pharmaceutically acceptable acid-addition salts thereof.

The novel compounds of the present invention are useful because they possess pharmacological activity. In particular, the compounds of Formula I are CNS depressants. The CNS depressant activity was evaluated by the isolation-induced aggressive behavior test of DaVanzo, J. P. et al., Psychopharmacologia 9, 210 (1966) using male albino mice. Compounds which possess CNS depressant activity using the method of DaVanzo cited above are considered to be major tranquilizers.

The novel compounds represented by Formula I were tested in groups of 5 mice at an initial dose of 20 mg./kg. intraperitoneally. Compounds which prevented the aggressive behavior in all mice were administered in additional doses to allow calculation of the effective dose$_{50}$ by the statistical method of Litchfield and Wilcoxon, J.

Pharmacol. Exptl. Therap., 96, 99 (1949). The pharmacological data is given as follows:

| Example: | Fighting mouse assay Mg./kg. i.p. | | No. protected/ No. tested |
|---|---|---|---|
| 1 | | $ED_{50}=7.2$ | |
| 2 | | $ED_{50}=1.6$ | |
| 3 | 20 | | 3/5 |
| 4 | | $ED_{50}=3.8$ | |
| 6 | 20 | | 1/5 |
| 7 | 20 | | 3/5 |
| 8 | 20 | | 3/5 |
| 9 | 20 | | 3/5 |
| 10 | | $ED_{50}=0.7$ | |
| 11 | 20 | | 3/5 |
| 12 | | $ED_{50}=14.1$ | |
| 13 | | $ED_{50}=6.0$ | |
| 14 | 20 | | 5/5 |
| 15 | 20 | | 2/5 |
| 16 | | $ED_{50}=11.7$ | |
| 17 | | $ED_{50}=4.5$ | |
| 18 | 20 | | 3/5 |
| 19 | 20 | | 2/5 |
| 22 | | $ED_{50}=4.6$ | |
| 23 | | $ED_{50}=2.9$ | |
| 24 | | $ED_{50}=13.2$ | |
| 25 | | $ED_{50}=13.5$ | |
| 26 | | $ED_{50}=14.1$ | |
| 27 | 20 | | 3/5 |
| 28 | | $ED_{50}=10.9$ | |

It is, therefore, an object of the present invention to provide novel compounds having valuable therapeutic properties. Another object is to provide novel compounds for the purposes of combating anxiety. A further object is to provide novel compositions comprising the compounds which possess beneficial tranquilizing activity. Additional objects will be apparent to one skilled in the art and still other objects will become apparent hereinafter.

The foregoing and additional objects are accomplished by the provision of certain novel 1-(ω-benzoylalkyl)-3-substituted pyrrolidines, pharmaceutically acceptable acid-addition salts thereof, and compositions containing the same as active ingredients.

In the definition of the symbols in the foregoing Formula I and where they appear elsewhere throughout the specification and claims thereof, the terms used herein have the following significance.

The term "lower alkyl" includes straight and branched chain radicals of up to eight carbon atoms inclusive and is exemplified by such groups as methyl, ethyl, propyl, isopropyl, butyl, isobutyl, tertiary butyl, amyl, isoamyl, hexyl, heptyl, octyl, and the like. The term "lower alkoxy" has the formula —O—lower alkyl.

When "halogen" is referred to herein, fluorine, chlorine and bromine represent those intended with fluorine being preferred.

The "phenyl" radical refers to the unsubstituted phenyl radical and a phenyl radical substituted by any radical or radicals which are not reactive or otherwise interfering under the conditions of reaction in preparing the desired compound, such radicals including lower alkoxy, lower alkyl, lower acyl, trifluoromethyl, halo, and the like. The substituted phenyl radicals have preferably one to three substituents such as those given above and, furthermore, these substituents can be in various available positions of the phenyl nucleus.

The term "benzoyl" has the formula phenyl

The term "carbamoyl" includes the primary carbamoyl radical; i.e., H₂NCO—, and substituted carbamoyl radicals such as N-lower alkyl carbamoyl, N,N-dilower alkyl carbamoyl and N-phenyl carbamoyl.

The compounds of the invention are most conveniently employed in the form of nontoxic pharmaceutically acceptable acid-addition salts which have improved water solubility over the free base. Although the nontoxic salts are preferred, any salt may be prepared for use as a chemical intermediate, as in the preparation of another acid-addition salt suitable for administration to an animal body for the desired physiological effect thereof. The free basic compounds of Formula I may be conveniently converted to their acid-addition salts by reaction of the free base with the selected acid, preferably in the presence of an organic solvent inert to the reactants and reaction products under the conditions of the reaction. The acids which can be used to prepare the preferred nontoxic acid-addition salts are those which produce, when combined with the free bases, salts, the anions of which are relatively innocuous to the animal organism in therapeutic doses of the salts, so that beneficial physiological properties inherent in the free bases are not vitiated by side effects ascribable to the anions.

Appropriate acid-addition salts are those derived from mineral acids such as hydrochloric acid, hydrobromic acid, hydroiodic acid, nitric acid, sulfuric acid, and phosphoric acid and organic acids such as acetic acid, citric acid, lactic acid, fumaric acid, and tartaric acid. The preferred acid-addition salt is the hydrochloride.

The acid-addition salts are prepared either by dissolving the free base in an aqueous solution containing the appropriate acid and isolating the salt by evaporating the solution, or by reacting the free base and the selected acid in an organic solvent, in which case the salt ordinarily separates directly or can be conventionally recovered by concentration of the solution or the like. Conversely, the free base may be obtained conventionally by neutralizing the acid, lactic acid, fumaric acid, and tartaric acid. The premonia, ammonium hydroxide, sodium carbonate or the like, extracting the liberated base with a suitable solvent, illustratively ethyl acetate or benzene, drying the extract and evaporating to dryness or fractionally distilling or in other conventional manner.

The novel compounds of this invention can be advantageously prepared by the condensation of a compound of the formula:

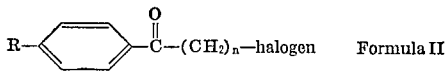

Formula II with an appropriately substituted pyrrolidine of the formula:

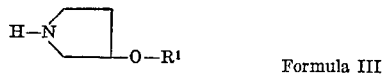

Formula III wherein the symbols are defined as above. When $R^1$ in Formula III is hydrogen, novel 1-(ω-benzoylalkyl)-3-hydroxypyrrolidines within the scope of Formula I are obtained from which additional novel compounds within the scope of Formula I are prepared by the further reaction of the 1-(ω-benzoylalkyl)-3-hydroxypyrrolidines with isocyanates and N,N-disubstituted carbamoyl halides.

The condensation can be carried out in an inert solvent such as an aromatic hydrocarbon as, for example, benzene, toluene or xylene, a lower alkanol as, for example, ethanol, propanol, butanol or isobutanol, or a lower alkanone as, for example, 2-butanone. The halogen in Formula II can be chlorine, bromine or iodine and the condensation is preferably run at a temperature of from about 60° C. to about 135° C. depending on the solvent used. A reaction time of from about 48 hours to about 80 hours is usually necessary to complete the reaction. The course of the reaction can be followed by thin layer chromatography. Generally speaking, condensations run for shorter periods of time or at lower temperatures result in lower yields of the final products.

The yields of the reaction disclosed hereinabove can be markedly increased by employing starting materials of Formula II as their ketals, i.e. as 2-phenyl-2-(ω-haloalkyl)-1,3-dioxolanes; intramolecular dehydrohalogenation which occurs to a marked degree when the free ketone is used is thereby minimized. Subsequent to the condensation, the ketone group is regenerated by mild acid hydrolysis.

The preparation of the requisite intermediates and examples illustrating the present invention are described hereinafter. The examples illustrate in detail some of the compounds which comprise this invention and methods for their production. However, this invention is not to be construed as limited thereby in spirit or scope. It will be apparent to one skilled in the art that numerous modifications in materials and methods can be made without departing from the invention.

PREPARATION OF INTERMEDIATES

A.—3-substituted phenoxypyrrolidines

A 1-benzyl-3-chloropyrrolidine or a 1-benzyl-3-pyrrolidinol tosylate is reacted with the sodium salt of an appropriately substituted phenol in a solvent such as dimethyl sulfoxide or dimethyl formamide. The reaction is preferably run from about 65° C. to about 115° C. for a period from about two hours to about fifteen hours. In general, the reactions wherein tosylates are used are run at the lower temperatures, generally around 65–75° C. and are completed in a shorter reaction time of from about two to about four hours. Reactions employing a 1-benzyl-3-chloropyrrolidine are run at the higher temperatures of 112–115° C. and for the longer periods of 12–15 hours. The 1-benzyl-3-phenoxypyrrolidines thus obtained are debenzylated by hydrogenolysis using palladium-on-charcoal to give the desired 3-phenoxypyrrolidines.

A 3-phenoxypyrrolidine containing a halogen in the phenoxy moiety is prepared by reacting the sodium salt of a halogenated phenol with 3-chloropyrrolidine. The preparation of 3-chloropyrrolidine is described in U.S. Pat. No. 3,318,908.

B.—ω-haloalkylbutyrophenones

The intermediates of Formula II used in the present invention are available from commercial sources or can be prepared by the method of Close, J. Am. Chem. Soc., 79, 1455 (1957) or by the procedures disclosed in Belgium Pat. 577,977.

C.—3-hydroxypyrrolidine 3-hydroxypyrrolidine is prepared by hydrogenolysis of 1-benzyl-3-hydroxypyrrolidine.

PREPARATION 1

1-benzyl-3-phenoxypyrrolidine fumarate

A solution of 317 g. (1 mole) of 1-benzyl-3-pyrrolidinol tosylate and 116 g. (1 mole) of sodium phenoxide in one liter of dimethyl sulfoxide was heated with stirring to 65° C. whereupon the reaction became exothermic and cooling became necessary for several minutes. The reaction temperature was maintained at 65° C. for one hour and then allowed to drop to room temperature while stirring over night. The mixture was treated with one liter of water followed by 1.5 moles of 50% sodium hydroxide solution. The water insoluble oil which separated was extracted using ether and the ether shaken with dilute hydrochloric acid. The acidic extracts were treated with 50% sodium hydroxide solution and the resulting free base was extracted into ether. After drying over magnesium sulfate the ether extracts were evaporated to an oil. Distillation of the oil gave 166 g. (67%) of pure product which boiled at 142–144° C./0.15 mm.

A sample of the product was converted to the fumarate salt which was recrystallized from isopropanol-isopropyl ether; the salt melted at 119–122° C. The analytical sample was recrystallized from isopropanol and melted at 120–123° C.

*Analysis.*—Calculated for $C_{21}H_{23}NO_5$ (percent): C, 68.28; H, 6.28; N, 3.79. Found (percent): C, 68.13; H, 6.32; N, 3.91.

PREPARATION 2

1-benzyl-3-(m-trifluoromethylphenoxy)-pyrrolidine hydrochloride

A mixture of 196 g. (1.0 mole) of 1-benzyl-3-chloropyrrolidine, 162 g. (1.0 mole) of m-trifluoromethylphenol, 40 g. (1.0 mole) of sodium methoxide and one liter of dimethyl sulfoxide was stirred and heated at 112–115° C. for 16 hours. The dispersion was then cooled, diluted with one liter of water and then treated with 80 g. (1.0 mole) of 50% sodium hydroxide solution. The solution was extracted with ether and the combined extracts washed with cold water. After the extracts were dried over magnesium sulfate the solvent was evaporated and the residual oil distilled at reduced pressure. The light yellow oil distilled at 135–137° C./.05 mm. and weighed 94 g. (29% yield). Thin layer chromatography indicated the distillate was a single component.

A portion (20 g.) of the free base was dissolved in ether and treated with an ether-hydrogen chloride solution. The crystalline product which formed on standing weighed 19.2 g. after drying and melted at 148.5–150.5° C. The melting point was unchanged after the product was recrystallized from an isopropanol-isopropyl ether mixture.

*Analysis.*—Calculated for $C_{18}H_{19}ClF_3NO$ (percent): C, 60.42; H, 3.35; N, 3.92. Found (percent): C, 60.37; H, 5.39; N, 3.92.

PREPARATION 3

1-benzyl-3-(o-methoxyphenoxy)pyrrolidine

A mixture of 102 g. (0.70 mole) of sodium guaiacolate, 137 g. (0.70 mole) of 1-benzyl-3-chloropyrrolidine and one liter of dimethyl sulfoxide was heated with stirring for 16 hours at 112–115° C. The mixture was cooled, diluted with one liter of water and treated with 80 g. (1.0 mole) of 50% sodium hydroxide solution. The solution was extracted with ether and the combined extracts were washed with water and dried over magnesium sulfate. After the solvent was evaporated the residual oil was distilled at reduced pressure. The light yellow oil distilled at 150–152° C./.05 mm. and weighed 92 g. (47% yield).

*Analysis.*—Calculated for $C_{18}H_{21}NO_2$ (percent): C, 76.29; H, 7.47; N, 4.94. Found (percent): C, 76.41; H, 7.47; N, 5.00.

PREPARATION 4

3-(o-methoxyphenoxy)pyrrolidine hydrochloride

A solution of 85.0 g. (0.3 mole) of 1-benzyl-3-(o-methoxyphenoxy)pyrrolidine in 300 ml. of 95% ethanol and 8 g. of Raney nickel was shaken several hours and then filtered. Ten grams of a 10% palladium-on-charcoal catalyst was added to the filtrate and the mixture was shaken with hydrogen at 60° C.; absorption of hydrogen ceased when one third of the required amount was absorbed. More catalyst was added (15 g.) and hydrogenation continued until one equivalent of hydrogen was absorbed. The suspension was cooled, filtered and the solvent evaporated at reduced pressure. The residual oil was distilled and the fraction which distilled at 91–93° C./.05 mm. was collected. The water-white, nonviscous oil weighed 48.3 g. (83% yield); $n^{22}$ 1.5562.

A solution of 5.8 g. (0.03 mole) of the oil in 100 ml. of dry ether was treated with ethereal hydrogen chloride. The precipitate which formed was collected and recrystallized from an isopropanol-isopropyl ether mixture. The pure compound melted at 123–124.5° C. and weighed 6.5 g. (94% yield).

*Analysis.*—Calculated for $C_{11}H_{16}NO_2Cl$ (percent): C, 57.51; H, 7.02; N, 6.10. Found (percent): C, 57.70; H, 7.19; N, 6.18.

PREPARATION 5

3-phenoxypyrrolidine hydrochloride

Two separate solutions of 83 g. (0.655 mole-total) of 1-benzyl-3-phenoxypyrrolidine in 250 ml. of 95% alcohol were shaken with Raney nickel for four hours, filtered and reduced using 10% palladium-on-charcoal catalyst. Both solutions took up the theoretical amount of hydrogen in two hours. The two solutions were combined and worked up on the usual manner. Distillation gave 88.6 g. (82% yield) of pure product which distilled at 79–83° C./0.02 mm.

The hydrochloride salt was prepared and recrystallized from isopropanol-isopropyl ether; M.P. 89–91° C.

*Analysis.*—Calculated for $C_{10}H_{14}ClNO$ (percent): C, 60.15; H, 7.07; N, 7.02. Found (percent): C, 60.06; H, 7.28; N, 7.05.

PREPARATION 6

3-(m-trifluoromethylphenoxy)pyrrolidine hydrochloride

A solution of 74 g. (0.23 mole) of 1-benzyl-3-(m-trifluoromethylphenoxy)pyrrolidine in 100 ml. of absolute ethanol was treated with about 6 g. of Raney nickel and the mixture was shaken for 16 hours and then filtered. Eight grams of 10% palladium-on-charcoal catalyst was added to the filtrate and the mixture was shaken with hydrogen at 60° C. until one equivalent of hydrogen was absorbed (1.5 hours). After cooling, the suspension was filtered and the solvent evaporated. The residual oil was distilled at reduced pressure and the fraction distilling at 62–65° C./.05 mm. collected. The water-white, nonviscous oil weighed 39.1 g. (74% yield).

TABLE I (PREPARATIONS 7–16)

[1-benzyl-3-phenoxypyrrolidines]

$C_6H_5CH_2-N\underset{}{\diagdown}\!\!-\!O-R^1$

| Preparation: | $R^1$ | M.P. ° C. or B.P. ° C./mm. | Formula |
|---|---|---|---|
| 7 | $C_6H_4OCH_3$-3 | 138–139.5 | $C_{22}H_{25}NO_6$ a |
| 8 | $C_6H_4OCH_3$-4 | 131–133 | $C_{22}H_{25}NO_6$ a |
| 9 | $C_6H_4OC_2H_5$-2 | 96–98 | $C_{23}H_{27}NO_6$ a |
| 10 | $C_6H_4OC_3H_7$-2 | 170–174/0.13 | $C_{20}H_{25}NO_2$ |
| 11 | $C_6H_4CH_3$-2 | 114.5–116.5 | $C_{22}H_{25}NO_5$ a |
| 12 | $C_6H_4F$-4 | 147–148 | $C_{17}H_{19}ClFNO$ b |
| 13 | $C_6H_4CONH_2$-2 | 120.5–122 | $C_{18}H_{20}N_2O_2$ |
| 14 | $C_6H_4CONCH_2CH_2OCH_2CH_2$-2 | 235–238/0.1 | $C_{22}H_{26}N_2O_3$ |
| 15 | $C_6H_4NH_2$-2 | 180–185/0.1 | $C_{17}H_{20}N_2O$ |
| 16 | $C_6H_4NHCOCH_3$-2 | 139–141 | $C_{23}H_{26}N_2O_6$ a | a Maleate salt.
b Hydrochloride salt.

Five grams of the free base was dissolved in ether and treated with an ether-hydrogen chloride solution. The white crystalline product which formed on standing weighed 4.1 g. after drying and melted at 91–94° C. The melting point was unchanged after the compound was recrystallized from an isopropanol-isopropyl ether mixture.

*Analysis.*—Calculated for $C_{11}H_{13}ClF_3NO$ (percent): C, 49.35; H, 4.89; N, 5.23. Found (percent): C, 49.31; H, 5.06; N, 5.46

The physical data of 1-benzyl-3-phenoxypyrrolidines and 3-phenoxypyrrolidines prepared by the methods disclosed in Preparations 1–6 are given in Tables I and II respectively.

TABLE II (PREPARATIONS 17–27)

[3-phenoxypyrrolidines]

| Preparation | R¹ | M.P. ° C. or B.P. ° C./mm. | Formula |
|---|---|---|---|
| 17 | $C_6H_4OCH_3$-3 | 110–112.5 | $C_{11}H_{16}ClNO_2$ [a] |
| 18 | $C_6H_4OCH_3$-4 | 130.5–132.5 | $C_{11}H_{16}ClNO_2$ |
| 19 | $C_6H_4OC_2H_5$-2 | 70–73 | $C_{16}H_{21}NO_5$ [b] |
| 20 | $C_6H_4OC_3H_7$-2 | 72–75 | $C_{17}H_{23}NO_6$ [b] |
| 21 | $C_6H_4CH_3$-2 | 94–97 | $C_{15}H_{19}NO_5$ [b] |
| 22 | $C_6H_4F$-4 | 119–121 | $C_{10}H_{13}ClFNO$ [a] |
| 23 | $C_6H_4CONH_2$-2 | 155–158 | $C_{11}H_{15}ClN_2O_2$ [a] |
| 24 | $C_6H_4CONCH_2CH_2OCH_2CH_2$-2 | 18 [d] | $C_{17}H_{23}N_3O_6$ [c] |
| 25 | $C_6H_4NHCOCH_3$-2 | 162–165 | $C_{16}H_{20}N_2O_6$ [e] |
| 26 | $C_6H_4NHCOC_6H_2(OCH_3)$-3,4,5 | 252–254 | $C_{20}H_{25}ClN_2O_5$ [a] |
| 27 | $C_6H_3COCH_3$-4, $OCH_3$-2 | 173–175 | $C_{13}H_{18}ClNO_3$ [a] |

[a] Hydrochloride salt.
[b] Maleate salt.
[c] Oxamate salt.
[d] Decanoate.
[e] Fumarate salt.

EXAMPLE 1

1-(3-benzoylpropyl)-3-(o-methoxyphenoxy)pyrrolidine

A mixture of 10 g. (0.052 mole) of 3-(o-methoxyphenoxy)pyrrolidine, 8.6 g. (0.047 mole) of γ-chlorobutyrophenone, 13 g. of potassium carbonate, 0.1 g. of potassium iodide and 100 ml. of toluene was stirred and refluxed under a nitrogen atmosphere for two days. The salts were filtered from the hot mixture and the solvent was removed from the filtrate using a rotary evaporator. The crude product (17.3 g.) was dissolved in benzene and chromatographed on 350 g. of magnesium silicate. The product began eluting from the column with 3% acetone-benzene Pure product was obtained from the column as an oil, 4.9 g. (31%). A small sample was distilled for analysis, B.P.190° C./0.007 mm.

*Analysis.*—Calculated for $C_{21}H_{25}NO_3$ (percent): C, 74.31; H, 7.42; N, 4.13. Found (percent): C, 74.63; H, 7.63; N, 4.24.

EXAMPLE 2

1-[3-(p-fluorobenzoyl)-propyl]-3-(o-methoxyphenoxy) pyrrolidine hydrochloride

A stirred mixture of 10 g. (0.052 mole) of 3-(o-methoxyphenoxy)pyrrolidine, 9.5 g. (0.052 mole) of p-fluoro-γ-chlorobutyrophenone and 20 g. of sodium bicarbonate in 100 ml. of methyl isobutyl ketone was refluxed for 48 hours. The mixture was cooled, shaken with 100 ml. of water, the organic layer was dried over magnesium sulfate and evaporated. The residual oil was converted to a hydrochloride which, after two recrystallizations from methyl isobutyl ketone, melted at 165–167° C.; yield 6.5 g. (36% yield). The analytical sample melted at 166–168° C.

*Analysis.*—Calculated for $C_{21}H_{25}ClFNO_3$ (percent): C, 64.03; H, 6.40; N, 3.56. Found (percent): C, 64.16; H, 6.52.

EXAMPLE 3

1-[3-(p-fluorobenzoyl)propyl]-3-(m-trifluoromethylphenoxy)pyrrolidine hydrochloride A mixture of 10.0 g. (0.05 mole) of γ-chloro-p-fluorobutyrophenone, 11.5 g. (0.05 mole) of 3-(m-trifluoromethylphenoxy)pyrrolidine, 15 g. of potassium carbonate and 100 ml. of toluene was stirred at reflux for three days. The cooled mixture was treated with 100 ml. of water, the organic layer separated and washed with cold water. The toluene was evaporated at reduced pressure; the residual oil (14.3 g.) was dissolved in benzene and chromatographed on 400 g. of 60–100 mesh magnesium silicate, eluting with benzene-acetone mixture. The product weighed 5.1 g. (26% yield). A solution of the free base was treated with an ether-hydrogen chloride solution and the crystalline product which formed on standing was separated by filtration and recrystallized from a methyl isobutyl ketone-isopropyl ether mixture. The light gray colored salt weighed 3.1 g. and melted at 127–130° C.

*Analysis.*—Calculated for $C_{21}H_{22}ClF_4NO_2$ (percent): C, 58.40; H, 5.14; N, 3.23. Found (percent): C, 58.61; H, 5.35; N, 3.33.

EXAMPLE 4

1-[3-(p-fluorobenzoyl)propyl]-3-phenoxypyrrolidine

A stirred solution of 15 g. (0.06 mole) of 2-(3-chloropropyl)-2-(p-fluorophenyl)-1,3 - dioxolane, 10 g. (0.06 mole) of 3-phenoxypyrrolidine and 20 g. of potassium carbonate in 200 ml. of 1-butanol was refluxed under a nitrogen atmosphere for 72 hours. The hot mixture was filtered, the filtrate was evaporated to an oil, the oil was dissolved in benzene and the benzene solution extracted with 3 N hydrochloric acid. The acid extracts were combined and made basic with 50% sodium hydroxide. The free base was taken into chloroform, the chloroform solution was dried over magnesium sulfate and the solvent evaporated under reduced pressure to an oil which crystallized on standing. Recrystallization from isooctane gave 10.1 g. (50% yield) of product which melted at 74–77° C.

*Analysis.*—Calculated for $C_{20}H_{22}FNO_2$ (percent): C, 73.37; H, 6.77; N, 4.28. Found (percent): C, 73.15; H, 6.76; N, 4.36.

EXAMPLE 5

1-(3-benzoylpropyl)-3-N-methylcarbamoyloxypyrrolidine

A mixture of 4.7 g. (0.02 mole) of 1(3-benzoylpropyl)-3-pyrrolidinol and 1.14 g. (0.02 mole) of methyl isocyanate in 100 ml. of dry benzene was stirred at room temperature for 18 hours. Aliquot analysis showed only partial reaction; the mixture was treated with an additional 3 g. of methyl isocyanate and refluxed four hours. The solvent and excess methyl isocyanate were removed under reduced pressure. On standing at room temperature the residual oil slowly solidified; the solid was recrystallized from isopropyl ether-isooctane; yield 3.1 g. (54%); M.P. 82–85° C.

Analysis.—Calculated for $C_{16}H_{22}N_2O_3$ (percent): C, 66.18; H, 7.64; N, 9.65. Found (percent): C, 66.22; H, 7.61; N, 9.63.

EXAMPLE 6

1-(3-benzoylpropyl)-3-N-phenylcarbamoyloxypyrrolidine

A mixture of 6.7 g. (0.029 mole) of 1-(3-benzoylpropyl)-3-pyrrolidinol and 3.42 g. (0.029 mole) of phenyl isocyanate in 100 ml. of dry benzene was allowed to reflux overnight under an atmosphere of nitrogen. The benzene was removed under reduced pressure and the residual oil solidified. Recrystallization of the solid from benzene-isooctane gave 9.5 g. (94% yield) of product which melted at 122–124° C.

Analysis.—Calculated for $C_{21}H_{24}N_2O_3$ (percent): C, 71.56; H, 6.86; N, 7.95. Found (percent): C, 71.87; H, 6.95; N, 7.86.

EXAMPLE 7

1-[3-(4-fluorobenzoyl)propyl]-3-N-phenylcarbamoyloxypyrrolidine

A solution of 2.7 g. (0.0107 mole) of 1-[3-(4-fluorobenzoyl)propyl]-3-pyrrolidinol and 1.28 g. (0.0107 mole) of phenyl isocyanate in 50 ml. of dry benzene was refluxed twelve hours. The mixture was filtered to remove a trace of insoluble material and then concentrated under reduced pressure to an oil which solidified. Recrystallization of the solid from benzene-isooctane gave 3.6 g. (90% yield) of product which melted at 117–119° C.

Analysis.—Calculated for $C_{21}H_{23}FN_2O_3$ (percent): C, 68.09; H, 6.26; N, 7.56. Found (percent): C, 68.30; H, 6.16; N, 7.63.

Using the procedures given in Examples 1–7, the following compounds are prepared:

1-[3-(4-bromobenzoyl)propyl]-3-phenoxypyrrolidine,
1-[4-(4-bromobenzoyl)butyl]-3-phenoxypyrrolidine,
1-[4-(4-fluorobenzoyl)butyl]-3-(m-trifluoromethylphenoxy)pyrrolidine,
1-(4-benzoylbutyl)-3-phenoxypyrrolidine,
1-[3-(4-fluorobenzoyl)propyl]-3-N-ethylcarbamoyloxypyrrolidine,
1-[4-(4-fluorobenzoyl)butyl]-3-N-ethylcarbamoyloxypyrrolidine, and
1-(3-benzoylpropyl)-3-N-propylcarbamoyloxypyrrolidine, by reacting:

p-bromo-γ-chlorobutyrophenone,
4-(p-bromobenzoyl)butyl chloride,
4-(p-fluorobenzoyl)butyl chloride,
4-benzoylbutyl chloride,
1-[3-(4-fluorobenzoyl)propyl]-3-hydroxypyrrolidine,
1-[4-(4-fluorobenzoyl)butyl]-3-hydroxypyrrolidine, and
1-(3-benzoylpropyl)-3-hydroxypyrrolidine, with:

3-phenoxypyrrolidine,
3-phenoxypyrrolidine,
3-(m-trifluoromethylphenoxy)pyrrolidine,
3-phenoxypyrrolidine,
ethyl isocyanate,
ethyl isocyanate, and
propyl isocyanate.

Examples 8–28 prepared by the procedures given in Examples 1–7, together with physical data, are listed in Table III.

TABLE III (EXAMPLES 8–28)

[1-(ω-benzoylalkyl)-3-substituted pyrrolidines]

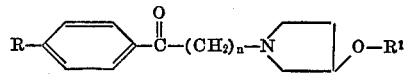

| Example: | R | R¹ | M.P. °C. or B.P. °C./mm. | Formula |
|---|---|---|---|---|
| 8 | F | $C_6H_4OCH_3$-3 | 118–122 | $C_{25}H_{28}FNO_7$ [a] |
| 9 | F | $C_6H_4OCH_3$-4 | 138.5–140.5 | $C_{21}H_{25}ClFNO_3$ [b] |
| 10 | F | $C_6H_4OC_2H_5$-2 | 78–81 | $C_{26}H_{30}FNO_7$ [a] |
| 11 | F | $C_6H_4OC_3H_7$-2 | 90–92 | $C_{27}H_{32}FNO_7$ [a] |
| 12 | Cl | $C_6H_4OCH_3$-2 | 182–184 | $C_{21}H_{25}ClNO_3$ [b] |
| 13 | F | $C_6H_3COCH_3$-4, $OCH_3$-2 | 76–79 | $C_{23}H_{26}FNO_4$ |
| 14 | F | $C_6H_4COCH_3$-4 | 83–84.5 | $C_{22}H_{24}FNO_3$ |
| 15 | F | $C_6H_4CH_3$-2 | 94–96 | $C_{25}H_{28}FNO_6$ [a] |
| 16 | F | $C_6H_4CONH_2$-2 | 91–94 | $C_{21}H_{23}FNO_3$ |
| 17 | F | $C_6H_4F$-4 | 165–167 | $C_{20}H_{22}ClF_2NO_2$ [b] |
| 18 | F | $C_6H_4NHCOCH_3$-2 | 109–115 | $C_{22}H_{25}FN_2O_3 \cdot H_2O$ |
| 19 | F | $C_6H_4[NHCOC_6H_2(OCH_3)-3,4,5]$-2 | 162–164 | $C_{32}H_{35}FN_2O_8$ [c] |
| 20 | F | $C_6H_4CONCH_2CH_2OCH_2CH_2$-2 | 165–167 | $C_{27}H_{31}FN_2O_6$ [d] |
| 21 | H | H | 142–144 | $C_{14}H_{20}ClNO_2$ [b] |
| 22 | F | H | 49–51 | $C_{14}H_{18}FNO_2$ |
| 23 | F | $CONHCH_3$ | 78–80 | $C_{16}H_{21}FN_2O_3$ |
| 24 | F | $C_2H_5$ | 151–155 | $C_{18}H_{24}FNO_6$ [d] |
| 25 | F | $COC_2H_5$ | 146–148 | $C_{19}H_{24}FNO_7$ [d] |
| 26 | F | $CONHC_6H_4CF_3$-3 | 146–148 | $C_{24}H_{24}FN_2O_7$ [d] |
| 27 | F | $COC_6H_2(OCH_3)$-3,4,5 | 175–177 | $C_{24}H_{29}ClFNO_6$ [b] |
| 28 | F | $C_6H_4OCH_3$-2 | 114–117 | $C_{22}H_{27}ClFNO_3$ [b] |

Note.—In Examples 8–27, $n$ is 3. In Example 28, $n$ is 4.
[a] Maleate salt.
[b] Hydrochloride salt.
[c] Hemifumarate salt.
[d] Oxalate salt.

FORMULATION AND ADMINISTRATION

Effective quantities of any of the foregoing pharmacologically active compounds may be administered to a living animal body in any one of various ways, for example, orally as in capsules or tablets, parenterally in the form of sterile solutions or suspensions, and in some cases intravenously in the form of sterile solutions. The free basic amino compounds, while effective, are preferably formulated and administered in the form of their non-toxic acid-addition salts for purposes of convenience of crystallization, increased solubility, and the like.

Although very small quantities of the active materials of the present invention, even as low as 0.1 milligram, are effective when minor therapy is involved or in cases of administration to subjects having a relatively low body weight, unit dosages are usually five milligrams or above and preferably twenty-five, fifty or one hundred milligrams. Five to fifty milligrams appears optimum per unit dose, while usual broader ranges appear to be one to 500 milligrams per unit dose. The active agents of the invention may be combined with other pharmacologically active agents, or with buffers, antacids or the like, for administration and the proportion of the active agent in the compositions may be varied widely. It is only necessary that the active ingredient constitute an effective amount, i.e., such that a suitable effective dosage will be obtained consistent with the dosage form employed. Obviously, several unit dosage forms may be administered at about the same time.

Examples of compositions within the preferred ranges given are as follows:

CAPSULES

Ingredients: Per cap, mg.
1. Active ingredient, as salt ---------------- 10.0
2. Lactose ------------------------------- 146.0
3. Magnesium stearate -------------------- 4.0

Procedure:
1. Blend 1, 2 and 3.
2. Mill this blend and blend again.
3. This milled blend is then filled into No. 1 hard gelatin capsules.

TABLETS

Ingredients: Mg./tab.
1. Active ingredient, as salt ---------------- 5.0
2. Corn starch -------------------------- 13.6
3. Corn starch (paste) ------------------- 3.4
4. Lactose ------------------------------ 79.2
5. Dicalcium phosphate ------------------ 68.0
6. Calcium stearate --------------------- 0.9

170.1

Procedure:
1. Blend 1, 2, 3, 4 and 5.
2. Add sufficient water portionwise to the blend from step No. 1 with careful stirring after each addition. Such additions of water and stirring continue until the mass is of a consistency to permit its conversion to wet granules.
3. The wet mass is converted to granules by passing it through the oscillating granulator, using 8-mesh screen.
4. The wet granules are then dried in an oven at 140° F.
5. The dried granules are then passed through an oscillating granulator, using a 10-mesh screen.
6. Lubricate the dry granules with 0.5% magnesium stearate.
7. The lubricated granules are compressed on a suitable tablet press.

INTRAMUSCULAR INJECTION

Ingredients:
1. Active ingredient, as salt _____mg. per ml__ 10.0
2. Isotonic buffer solution 4.0, q.s to 2.0 ml.

Procedure:
1. Dissolve the active ingredient in the buffer solution.
2. Aseptically filter the solution from step No. 1.
3. The sterile solution is now aseptically filled into sterile ampoules.
4. The ampoules are sealed under aseptic conditions.

Various modifications and equivalents will be apparent to one skilled in the art and may be made in the compounds, methods, compositions, and procedures of the present invention without departing from the spirit or scope thereof, and it is therefore to be understood that the invention is to be limited only by the scope of the appended claims.

What is claimed is:
1. A compound selected from the group consisting of 1-(ω-benzoylalkyl)-3-substituted pyrrolidines having the formula:

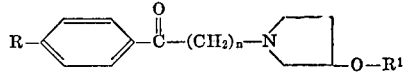

wherein;

R is selected from the group consisting of hydrogen, fluorine, chlorine and bromine, $R^1$ is selected from the group consisting of hydrogen, carbamoyl, lower-alkyl, lower-alkyl carbonyl, phenyl carbonyl and phenyl, wherein phenyl is the unsubstituted phenyl radical and the substituted phenyl radical wherein the number of substituents is from one to three and the substituents are selected from the group consisting of halogen, lower-alkoxy, acetyl, lower-alkyl, carbamoyl, trifluoromethyl, acetamido, phenylcarbonylamino and phenylcarbonyl, wherein carbamoyl is the unsubstituted carbamoyl radical and the N-substituted carbamoyl radical, the substituents being selected from the group consisting of lower-alkyl and phenyl, $n$ is a positive integer from 3 to 4 inclusive, and pharmaceutically acceptable acid-addition salts thereof.

2. A compound of claim 1 which is 1-[3-(4-fluorobenzoyl)propyl]-3-phenoxypyrrolidine.

3. A compound of claim 1 which is 1-[3-(4-fluorobenzoyl)propyl]-3-(2-methoxyphenoxy)pyrrolidine.

4. A compound of claim 1 which is 1-[3-(4-fluorobenzoyl)propyl]-3-(2-ethoxyphenoxy)pyrrolidine.

5. A compound of claim 1 which is 1-(3-benzoylpropyl)-3-(2-methoxyphenoxy)pyrrolidine.

6. A compound of claim 1 which is 1-[3-(4-fluorobenzoyl)propyl]-3-(4 - acetyl - 2 - methoxyphenoxy)pyrrolidine.

7. A compound of claim 1 which is 1-[3-(4-fluorobenzoyl)propyl]-3-(4-fluorophenoxy)pyrrolidine.

8. A compound of claim 1 which is 1-[3-(4-fluorobenzoyl)propyl]-3-hydroxypyrrolidine.

9. A compound of claim 1 which is 1-[3-(4-fluorobenzoyl)propyl] - 3 - (N - methylcarbamoyloxy)pyrrolidine.

10. A compound of claim 1 which is 1-[3-(4-chlorobenzoyl)propyl]-3-(2-methoxyphenoxy)pyrrolidine.

11. A compound of claim 1 which is 1-[3-(4-fluorobenzoyl)propyl]-3-(2-carbamoylphenoxy)pyrrolidine.

12. A compound of claim 1 which is 1-[3-(4-fluorobenzoyl)propyl]-3-ethoxypyrrolidine.

13. A compound of claim 1 which is 1-[3-(4-fluorobenzoyl)propyl]-3-ethylcarbonyloxypyrrolidine.

14. A compound of claim 1 which is 1-[3-(4-fluorobenzoyl)propyl] - 3 - [N - (3 - trifluoromethylphenylcarbamoyl)oxy]pyrrolidine.

15. A compound of claim 1 which is 1-[4-(4-fluorobenzoyl)butyl]-3-(2-methoxyphenoxy)pyrrolidine.

References Cited

UNITED STATES PATENTS 3,151,124   9/1964   Huebner _____ 260—326.5
3,305,562   2/1967   Heffe _____ 260—326.5
3,314,970   4/1967   Seeger _____ 260—326.5

ALEX MAZEL, Primary Examiner

J. A. NARCAVAGE, Assistant Examiner

U.S. Cl. X.R.

260—247.5, 326.5, 340.9; 424—248, 274